US012781154B2

(12) United States Patent
Wu et al.

(10) Patent No.: US 12,781,154 B2
(45) Date of Patent: Nov. 3, 2026

(54) OIL COMPOSITION HAVING GOOD STABILITY

(71) Applicant: Chenguang Biotech Group Co., Ltd., Hebei (CN)

(72) Inventors: Di Wu, Hebei (CN); Yunhe Lian, Hebei (CN); Wei Gao, Hebei (CN); Baojiang Chen, Hebei (CN); Mengyao Zhao, Hebei (CN)

(73) Assignee: CHENGUANG BIOTECH GROUP CO., LTD., Hebei (CN)

( * ) Notice: Subject to any disclaimer, the term of this patent is extended or adjusted under 35 U.S.C. 154(b) by 762 days.

(21) Appl. No.: 17/923,502

(22) PCT Filed: Apr. 30, 2021

(86) PCT No.: PCT/CN2021/091542
§ 371 (c)(1),
(2) Date: Nov. 4, 2022

(87) PCT Pub. No.: WO2021/223680
PCT Pub. Date: Nov. 11, 2021

(65) Prior Publication Data

US 2023/0348814 A1 Nov. 2, 2023

(30) Foreign Application Priority Data

May 6, 2020 (CN) ......................... 202010371917.8

(51) Int. Cl.
*C11B 5/00* (2006.01)
*A23D 9/007* (2006.01)

(52) U.S. Cl.
CPC ............ *C11B 5/0035* (2013.01); *A23D 9/007* (2013.01)

(58) Field of Classification Search
CPC .............................. C11B 5/0035; A23D 9/007
See application file for complete search history.

(56) References Cited

FOREIGN PATENT DOCUMENTS

| | | | | | |
|---|---|---|---|---|---|
| CN | 103404614 | A | | 11/2013 | |
| CN | 104911027 | A | | 9/2015 | |
| CN | 105724601 | A | | 7/2016 | |
| WO | WO-2009045952 | A1 | * | 4/2009 | ............. A61K 36/15 |

OTHER PUBLICATIONS

Chen et al., "Antioxidant activity of natural flavonoids is governed by number and location of their aromatic hydroxyl groups". Chemistry and Physics of Lipids 79 (1996) 157-163. (Year: 1996).*
Wang et al., "In vitro antioxidant, anti-diabetic and antilipemic potentials of quercetagetin extracted from marigold (*Tagetes eracta* L. ) inflorescence residues". J. Food Sci Technol (Jun. 2016) 53(6):2614-2624. (Year: 2016).*
International Search Report issued in International Application No. PCT/CN2021/091542, mailed on Jul. 22, 2021.
Jie et al., "Preparation and characteristics of quercetagetin nanoemulsions: the effects of emulsifiers, pH, ionic strength and thermal treatmenton its properties", China Food Additives, 2016, pp. 127-134.
Luo et al., "Synthesis and Properties of Quercetagetin Complex with Fe(III)", Chinese Journal of Spectroscopy Laboratory, 27(6): 2512-2515 (2010).
Wanyo et al. "Marigold flower-powder exhibits significant potential to inhibit lipid oxidation in rice bran tea." Food & function 6.6 (2015): 1808-1817.

* cited by examiner

*Primary Examiner* — Erik Kashnikow
*Assistant Examiner* — Assaf Zilbering
(74) *Attorney, Agent, or Firm* — Knobbe, Martens, Olson & Bear, LLP

(57) ABSTRACT

A high-stability oil composition including an oil and quercetagetin. Quercetagetin, as a stabilizer, can delay an oxidation process of the oil and ensure the stability of the oil. The content of the quercetagetin may be more than 1 ppm, preferably more than 5 ppm, more than 10 ppm; preferably more than 20 ppm, more than 30 ppm, more than 40 ppm, more than 50 ppm, more than 60 ppm, more than 70 ppm, more than 80 ppm, more than 90 ppm, preferably more than 100 ppm, more than 200 ppm, more than 300 ppm, more than 400 ppm, more than 500 ppm, more than 600 ppm, more than 700 ppm, more than 800 ppm, more than 900 ppm; preferably more than 1000 ppm, more than 2000 ppm, more than 3000 ppm, more than 4000 ppm, more than 5000 ppm.

20 Claims, No Drawings

OIL COMPOSITION HAVING GOOD STABILITY

CROSS-REFERENCE TO RELATED APPLICATION

The present application claims priority to Chinese Patent Application No. 202010371917.8, entitled "OIL COMPOSITION HAVING GOOD STABILITY", and filed on May 6, 2020, the entire disclosure of which is incorporated herein by reference in its entirety.

TECHNICAL FIELD

The present invention relates to the field of food and feed, specifically, to use of quercetagetin as an additive of food, feed, etc. In particular, the present invention relates to use of quercetagetin as an additive in oil.

BACKGROUND ART

Oil is one of the basic nutrients in human diet, and is also the most commonly used feed material in agriculture and animal husbandry. Edible oil and oily food or feed is easy to get rancid during storage, which will lead to deterioration of oil and food or feed. The main reason for the rancidity of oil is the hydrolysis and oxidation of oil. Under the action of lipase, the oil will be hydrolyzed into glycerol, mono- and di-glycerides and free fatty acids. The lipase in the oil can be destroyed or eliminated by heating, refining and the like, so as to prevent the hydrolysis of the oil. Refined oil contains almost no water and lipase, and rarely deteriorates due to hydrolysis. Therefore, the oxidation is the main reason for deterioration of refined oil.

The antioxidant in food or feed should have the following features: (1) less addition, and good effect; (2) coexisting with food or feed; and (3) non-toxic and harmless to humans or animals. It is also required that the antioxidant added to food has no effect on the sensory properties of food (including smell, taste, color and the like).

Peroxide value (POV) is one of the quality indexes of edible oil, and it is stipulated by the state that POV (meq/kg) in edible oil is ≤20. In order to prolong the shelf life, antioxidants generally must be added to the edible oil. At present, the natural antioxidants used by the international food industry include tea polyphenols, rosemary antioxidants, sodium salt of isovitamin C, vitamin C, vitamin E and the like, and the mixtures thereof Among them, water-soluble substances such as sodium salt of isovitamin C, vitamin C, tea polyphenols do not have strong antioxidant effects for oils; vitamin E has a certain antioxidant effect for oil, but the price is expensive, which leads to a significant increase in product cost after addition of vitamin E; Some newly developed antioxidants, such as licorice antioxidant, do not meet the standards of food additives in terms of use effect and antioxidant effect.

There are also many substances that can be used as feed antioxidants, such as L-ascorbic acid, butylated hydroxytoluene (BHT), butylated hydroxymethoxybenzene, tocopherol, propyl gallate (or octyl ester, dodecyl ester), ethoxyquinoline and other antioxidants used in food. Because of price and other reasons, the antioxidant used in feed is mainly ethoxyquinoline (ethoxyquin or abbreviated as EQ), which is the most widely used feed antioxidant at home and abroad, with good effect and low price. However, due to the safety problems of EQ, it has been completely prohibited and limited. There is an urgent need for an oil stabilizer to replace EQ.

Quercetagetin with chemical name of 3,3',4',5,6,7-hexahydroxy flavone, has important pharmacological effects such as anti-inflammatory, anti-allergic, hypotensive, anti-arrhythmia, antiplatelet aggregation, anti-tumor and the like. At present, the research of quercetagetin is mainly focused on its pharmacological activity, which has not yet been used in the field of food and feed additives.

The present application found that the addition of quercetagetin can greatly improve the antioxidation of oil, so as to improve the stability of oil products. The antioxidation performance of quercetagetin is much better than the commonly used antioxidant additives in food and feed. Moreover, the antioxidant effect of quercetagetin as an antioxidant added in oil is much better than that of quercetagetin added in other substrates.

SUMMARY OF THE INVENTION

To improve the quality of oil, the present invention provides an oil composition comprising quercetagetin.

The oil in the above oil composition can be derived from plants or animals, including, but not limited to, plant oil such as soybean oil, cottonseed oil, sunflower seed oil, peanut oil, olive oil, sesame oil, palm oil, corn oil, cocoa butter, etc., and animal oil such as lard, beef fat, sheep oil, fish oil, cream, etc. In addition, the oil can be crude oil, refined oil or processed oil, such as hydrogenated oil, margarine, shortening, oil powder and the like.

The oil composition comprises quercetagetin, wherein the content of the quercetagetin is more than 1 ppm, preferably more than 2 ppm, more than 3 ppm, more than 4 ppm, more than 5 ppm, more than 6 ppm, more than 7 ppm, more than 8 ppm, more than 9 ppm, more than 10 ppm; preferably more than 20 ppm, more than 30 ppm, more than 40 ppm, more than 50 ppm, more than 60 ppm, more than 70 ppm, more than 80 ppm, more than 90 ppm, preferably more than 100 ppm, more than 200 ppm, more than 300 ppm, more than 400 ppm, more than 500 ppm, more than 600 ppm, more than 700 ppm, more than 800 ppm, more than 900 ppm; preferably more than 1000 ppm, more than 2000 ppm, more than 3000 ppm, more than 4000 ppm, or more than 5000 ppm.

In one embodiment, the content of the quercetagetin is less than 100%, preferably less than 90%, less than 80%, less than 70%, less than 60%, less than 50%, less than 40%, less than 30%, less than 20%, less than 10%; more preferably less than 90%, less than 80%, less than 70%, less than 60%, less than 50%, less than 40%, less than 30%, less than 20%; more preferably less than 90%, less than 80%, less than 70%, less than 60%, less than 50%, or less than 40%.

The present application also relates to use of quercetagetin in oil, that is, as an oil stabilizer. The oil can be derived from plants or animals, including, but not limited to, plant oil such as soybean oil, cottonseed oil, sunflower seed oil, peanut oil, olive oil, sesame oil, palm oil, corn oil, cocoa butter, etc., and animal oil such as lard, beef fat, sheep oil, fish oil, cream, etc. In addition, the oil can be crude oil, refined oil or processed oil, such as hydrogenated oil, margarine, shortening, oil powder and the like. Use of quercetagetin in oil, the content of the quercetagetin is more than 1 ppm, preferably more than 2 ppm, more than 3 ppm, more than 4 ppm, more than 5 ppm, more than 6 ppm, more than 7 ppm, more than 8 ppm, more than 9 ppm, more than 10 ppm; preferably more than 20 ppm, more than 30 ppm, more than 40 ppm, more than 50 ppm, more than 60 ppm, more than 70 ppm, more than 80 ppm, more than 90 ppm, preferably more than 100 ppm, more than 200 ppm, more than 300 ppm, more than 400 ppm, more than 500 ppm, more than 600 ppm, more than 700 ppm, more than 800 ppm, more than 900 ppm; preferably more than 1000 ppm, more than 2000 ppm, more than 3000 ppm, more than 4000 ppm, or more than 5000 ppm.

The present application also relates to use of quercetagetin as an oil stabilizer in food, feed, health care products, drugs and/or cosmetics containing oil and the raw material ingredients of the food, feed, health care products, drugs and/or cosmetics containing oil. Preferably, the use is to improve the stability of food, feed, health care products, drugs and/or cosmetics containing oil and the stability of the raw material ingredients of the food, feed, health care products, drugs and/or cosmetics containing oil.

More preferably, the use is to protect food, feed, health care products, drugs and/or cosmetics containing oil and prevent the food, feed, health care products, drugs and/or cosmetics containing oil from oxidation loss.

Use of quercetagetin as an oil stabilizer in food, feed, health care products, drugs and/or cosmetics containing oil, wherein the content of the quercetagetin is more than 1 ppm, preferably more than 2 ppm, more than 3 ppm, more than 4 ppm, more than 5 ppm, more than 6 ppm, more than 7 ppm, more than 8 ppm, more than 9 ppm, more than 10 ppm; preferably more than 20 ppm, more than 30 ppm, more than 40 ppm, more than 50 ppm, more than 60 ppm, more than 70 ppm, more than 80 ppm, more than 90 ppm, preferably more than 100 ppm, more than 200 ppm, more than 300 ppm, more than 400 ppm, more than 500 ppm, more than 600 ppm, more than 700 ppm, more than 800 ppm, more than 900 ppm; preferably more than 1000 ppm, more than 2000 ppm, more than 3000 ppm, more than 4000 ppm, or more than 5000 ppm.

In one embodiment, the use of quercetagetin as an oil stabilizer in food, feed, health care products, drugs and/or cosmetics containing oil, wherein the content of the quercetagetin is less than 100%, preferably less than 90%, less than 80%, less than 70%, less than 60%, less than 50%, less than 40%, less than 30%, less than 20%, less than 10%; more preferably less than 90%, less than 80%, less than 70%, less than 60%, less than 50%, less than 40%, less than 30%, less than 20%; more preferably less than 90%, less than 80%, less than 70%, less than 60%, less than 50%, or less than 40%.

Beneficial Effect

The inventor of the present application found that the antioxidant effect of quercetagetin in oil is much better than the commonly used antioxidant ethoxyquinoline or other antioxidants. When the content of quercetagetin in oil is more than 8 ppm, the antioxidant performance is equivalent to that of 150 ppm ethoxyquinoline (EQ). Therefore, the quercetagetin has a technical effect of low usage, high antioxidation, and significantly improving the stability of oil. Moreover, quercetagetin, as an antioxidant, has an antioxidant effect after being added in oil much better than its antioxidant effect after being added in other substrates, for example, its mitigation effect on the oxidation loss of pigment and vitamin is not obvious.

SPECIFIC MODES FOR CARRYING OUT THE EMBODIMENTS

In order to make the purpose, technical solution and advantages of the present invention more clear, the present invention is further described in detail below in combination with the examples. It should be understood that the specific examples described herein are only used to explain the present invention, not to define the present invention.

1. Oil Composition

(1) Preparation of Experimental Examples

The preparation method of the oil composition containing quercetagetin is as follows.

(i) Three portions of chicken oil and beef fat were taken, 100 g each, respectively, to which quercetagetin was added with an amount of 4 ppm, 6 ppm, and 8 ppm, respectively, and the resultants were stirred evenly.

(ii) 150 g of fish oil powder were taken, 0.075 g (experimental group 1), 0.15 g (experimental group 2) and 0.3 g (experimental group 3) of quercetagetin were added respectively, and the resultants were mixed evenly.

(2) Preparation of Comparative Examples (i) Ethoxyquinoline control group: one portion of chicken oil and one portion of beef fat with 100 g each were taken, to which ethoxyquinoline was added with an amount of 150 ppm;

(ii) BHT control group: one portion of chicken oil and one portion of beef fat with 100 g each were taken, to which BHT was added with an amount of 150 ppm.

2. Feed Composition Containing Vitamin

The composition proportion of pig feed used in this experiment is shown in Table 1, wherein it was guaranteed that vitamin A is 4000 IU/kg and vitamin E is 45 IU/kg.

TABLE 1

Composition of pig feed used in antioxidant effect test

| Feed composition | Percentage/% |
|---|---|
| Corn | 49.5 |
| Bran | 5.0 |
| Bean Cake | 21.0 |
| Fine wheat bran | 10.0 |
| Paddy | 12.0 |
| Bone Meal | 1 |
| Shell powder | 0.6 |
| Table salt | 0.4 |
| Vitamin/mineral premix | 0.5 |

(1) Preparation of Experimental Examples

Pig feed composition: three portions of pig feed as shown in Table 1 above were taken, 100 g each, to which quercetagetin was added with an amount of 4 ppm, 6 ppm, and 8 ppm, respectively, and the resultants were stirred evenly.

(2) Preparation of Comparative Examples (i) Ethoxyquinoline control group: one portion of 100 g of pig feed as shown in Table 1 above was taken, to which ethoxyquinoline was added with an amount of 150 ppm;

(ii) BHT control group: one portion of 100 g of pig feed as shown in Table 1 above was taken, to which BHT was added with an amount of 150 ppm;

3. Feed-Grade Lutein Powder Composition (1) Preparation of Experimental Examples Feed-grade lutein powder composition: 100 g of feed-grade lutein powder was taken, quercetagetin was added with an amount of 3%, and the resultants were stirred evenly.

(2) Preparation of Comparative Examples 100 g of feed-grade lutein powder was taken, ethoxyquinoline was added with an amount of 3%, and the resultants were stirred evenly.

Study of Stability Effect

1. Oil (1) 100 g of ordinary chicken oil and 100 g of ordinary beef fat were taken as the blank control groups;

The oils or oil compositions prepared in the above blank control groups, the above experimental examples and comparative examples were placed in a 40° C. incubator, the samples were taken at 0, 3rd, 7th, 14th, 21th and 28th day respectively to detect the peroxide value of each group. The results are shown in Table 2 and Table 3. Compared with ordinary chicken oil and beef fat, when quercetagetin exists in the oil, it can delay the process of oil oxidation loss. The effect of quercetagetin with the content of 8 ppm, is equivalent to that of 150 ppm of ethoxyquinoline or BHT.

TABLE 2

Evaluation on peroxide value of chicken oil containing quercetagetin

| Days | Ordinary chicken oil | Chicken oil containing quercetagetin Content of quercetagetin 4 ppm | 6 ppm | 8 ppm | Ethoxyquinoline 150 ppm | BHT 150 ppm |
|---|---|---|---|---|---|---|
| 0 | 1.116 ± 0.039 | 1.125 ± 0.100 | 1.053 ± 0.088 | 1.077 ± 0.037 | 1.104 ± 0.071 | 1.041 ± 0.056 |
| 3 | 1.256 ± 0.070 | $1.119 \pm 0.048^{ab}$ | $1.109 \pm 0.072^{ab}$ | $1.110 \pm 0.115^{ab}$ | $1.100 \pm 0.055^{b}$ | $1.137 \pm 0.022^{b}$ |
| 7 | $1.853 \pm 0.027^{a}$ | $1.402 \pm 0.051^{b}$ | $1.398 \pm 0.069^{b}$ | $1.333 \pm 0.019^{b}$ | $1.129 \pm 0.034^{c}$ | $1.219 \pm 0.147^{b}$ |
| 14 | $2.601 \pm 0.239^{a}$ | $2.405 \pm 0.044^{b}$ | $2.214 \pm 0.106^{c}$ | $1.560 \pm 0.072^{a}$ | $1.564 \pm 0.100^{d}$ | $1.632 \pm 0.030^{d}$ |
| 21 | $5.199 \pm 0.304^{a}$ | $3.856 \pm 0.043^{b}$ | $3.291 \pm 0.257^{c}$ | $2.901 \pm 0.169^{c}$ | $2.852 \pm 0.376^{c}$ | $2.913 \pm 0.131^{c}$ |
| 28 | $5.920 \pm 0.592^{a}$ | $5.703 \pm 0.311^{a}$ | $3.544 \pm 0.695^{b}$ | $3.222 \pm 0.378^{b}$ | $2.959 \pm 0.045^{b}$ | $3.208 \pm 0.167^{b}$ |

Note:
In the superscripts of data of the same column or row, the same lowercase letters indicate no significant difference ($P > 0.05$); the different lowercase letters indicate significant difference ($P < 0.05$); and the different capital letters indicate extremely significant difference ($P < 0.01$). The following is same as above.

TABLE 3

Evaluation on peroxide value of beef fat containing quercetagetin

| Days | Peroxide value (mmol/kg) Ordinary beef fat | Beef fat containing quercetagetin 4 ppm | 6 ppm | 8 ppm | Ethoxy quinoline 150 ppm | BHT 150 ppm |
|---|---|---|---|---|---|---|
| 0 | 1.550 ± 0.057 | 1.519 ± 0.010 | 1.477 ± 0.101 | 1.582 ± 0.145 | 1.538 ± 0.104 | 1.403 ± 0.026 |
| 3 | $1.857 \pm 0.112^{a}$ | $1.612 \pm 0.101^{bc}$ | $1.593 \pm 0.190^{b}$ | $1.607 \pm 0.015^{bc}$ | $1.496 \pm 0.118^{bc}$ | $1.470 \pm 0.059^{b}$ |
| 7 | $2.212 \pm 0.093^{a}$ | $2.128 \pm 0.077^{a}$ | $1.891 \pm 0.078^{b}$ | $1.636 \pm 0.152^{b}$ | $1.587 \pm 0.211^{b}$ | $1.625 \pm 0.064^{b}$ |
| 14 | $2.738 \pm 0.100^{a}$ | $2.303 \pm 0.121^{b}$ | $1.950 \pm 0.077^{c}$ | $1.754 \pm 0.043^{c}$ | $1.636 \pm 0.107^{c}$ | $1.699 \pm 0.095^{c}$ |
| 21 | $3.211 \pm 0.162^{a}$ | $2.956 \pm 0.068^{b}$ | $2.307 \pm 0.196^{c}$ | $2.017 \pm 0.110^{d}$ | $1.909 \pm 0.256^{d}$ | $1.969 \pm 0.084^{d}$ |
| 28 | $4.475 \pm 0.321^{a}$ | $3.192 \pm 0.237^{b}$ | $2.732 \pm 0.100^{c}$ | $2.221 \pm 0.161^{c}$ | $2.215 \pm 0.240^{c}$ | $2.499 \pm 0.298^{c}$ |

(2) 150 g of fish oil powder was taken as a blank control group;

The oil powder or oil powder composition prepared by the above blank control group and the above experimental example were placed in an oven, kept at 40° C. and high humidity, to conduct strong oxidation experiments. The samples were taken at 0, 3rd, 6th, 9th, 12th, and 15th day respectively to detect a peroxide value of each group. The results are shown in Table 4. Compared with the blank fish oil powder, when quercetagetin exists, it can delay the process of oxidation loss of the fish oil powder.

TABLE 4

Evaluation on peroxide value of fish oil powder containing quercetagetin

| Item | Peroxide value (mmol/kg) 0 d | 3 d | 6 d | 9 d | 12 d | 15 d |
|---|---|---|---|---|---|---|
| Control group | 2.16 | 2.36 | 6.41 | 69.07 | 84.76 | 170.69 |
| Experimental group 1 | 2.16 | 3.34 | 4.47 | 13.73 | 19.31 | 87.3 |
| Experimental group 2 | 2.16 | 2.01 | 4.49 | 9.4 | 12.79 | 20.18 |
| Experimental group 3 | 2.16 | 1.9 | 3.9 | 8.27 | 10.87 | 22.86 |

2. Feed Containing Vitamin 100 g of pig feed shown in Table 1 was taken as a blank control group;

The pig feed compositions prepared by the above blank control group, the above experimental examples and comparative examples were sealed in plastic bags and stored at room temperature. Samples were taken at 0, 14th, 28th, 49th and 77th day respectively to detect the contents of vitamin A and vitamin E in each group. The results show (Table 5) that during the storage of the pig feed for 0-77 days, compared with the ordinary pig feed, the contents of vitamin A and vitamin E in the pig feed containing quercetagetin are more consistent at different times, that is, the process of oxidation loss of vitamin A and vitamin E is not effectively delayed; Compared with the pig feed containing ethoxyquinoline or BHT, the oxidation loss of vitamin A and vitamin E in the pig feed containing quercetagetin is faster.

TABLE 5

Evaluation on vitamin stability of pig feed containing quercetagetin

| Days | Vitamin species | Content of vitamin (IU/kg) Ordinary pig feed | Quercetagetin 4 ppm | Quercetagetin 6 ppm | Quercetagetin 8 ppm | Ethoxyquinoline 150 ppm | BHT 150 ppm |
|---|---|---|---|---|---|---|---|
| 0 | A | 4150 | 4150 | 4150 | 4150 | 4150 | 4150 |
| | E | 46.0 | 46.0 | 46.0 | 46.0 | 46.0 | 46.0 |
| 14 | A | 4050 | 4050 | 4050 | 4100 | 4150 | 4150 |
| | E | 45.2 | 45.0 | 45.1 | 45.5 | 45.9 | 45.6 |
| 28 | A | 3750 | 3700 | 3800 | 3800 | 3900 | 3800 |
| | E | 41.6 | 41.8 | 40.7 | 42.1 | 43.9 | 42.5 |
| 49 | A | 3350 | 3400 | 3450 | 3250 | 3450 | 3400 |
| | E | 37.3 | 37.0 | 36.8 | 37.6 | 38.0 | 37.2 |
| 77 | A | 2700 | 2700 | 2650 | 2650 | 2750 | 2700 |
| | E | 32.1 | 31.5 | 30.9 | 32.0 | 32.8 | 31.8 |

3. Feed-Grade Lutein 100 g of feed-grade lutein powder was taken as a blank control group;

The feed-grade lutein powder compositions prepared by the above blank control group, the above experimental examples and comparative examples were stored at 25° C. in the dark for 20 days, at 25° C. in the indoor natural light for 20 days, at 25° C. in the dark and sealed for 20 days, and at 140° C. by heating for 1 hour respectively to detect contents of lutein and calculate the loss ratio of lutein. The results show that (Table 6), compared with the blank control group, the loss of lutein content in the feed-grade lutein powder containing quercetagetin is relatively consistent under different conditions, that is, the presence of quercetagetin does not effectively delay the loss process of lutein.

TABLE 6

Evaluation on a loss of content of feed-grade lutein containing quercetagetin

| | Loss at 25° C. in the dark for 20 days | Loss at 25° C. in the indoor natural light for 20 days | Loss at 25° C. in the dark and sealed for 20 days | Loss at 140° C. by heating for 1 hour |
|---|---|---|---|---|
| Blank group | 17.15% | 25.23% | 7.84% | 10.24% |
| Example | 16.58% | 25.67% | 7.94% | 9.45% |
| Comparative example | 8.54% | 13.68% | 3.55% | 6.21% |

INDUSTRIAL APPLICABILITY

The present invention provides a high-stability oil composition containing oil and quercetagetin. Quercetagetin, as a stabilizer, can delay an oxidation process of oil and ensure the stability of oil. The oil composition provided by the present invention has good economic value and application prospect.

What is claimed is:

1. A method for imparting oxidative stability to an oil over a period of two days or more, comprising:

adding quercetagetin as an oil stabilizer in the oil, storing the oil for the two days or more.

2. The method according to claim 1, wherein the method is to impart oxidative stability to food, feed, health care products, drugs and/or cosmetics containing the oil, or impart oxidative stability to raw material ingredients of the food, feed, health care products, drugs and/or cosmetics containing the oil.

3. The method according to claim 1, wherein, the method is for protecting the food, feed, health care products, drugs and/or cosmetics containing oil and preventing the food, feed, health care products, drugs and/or cosmetics containing oil from oxidation loss.

4. The method according to claim 1, wherein the amount of the quercetagetin added in the oil is more than 1 ppm.

5. The method according to claim 2, wherein the amount of the quercetagetin added in the oil is more than 1 ppm.

6. The method according to claim 3, wherein the amount of the quercetagetin added in the oil is more than 1 ppm.

7. The method according to claim 1, wherein the amount of the quercetagetin added in the oil is more than 10 ppm.

8. The method according to claim 1, wherein the amount of the quercetagetin added in the oil is more than 100 ppm.

9. The method according to claim 1, wherein the amount of the quercetagetin added in the oil is more than 200 ppm.

10. The method according to claim 1, wherein the amount of the quercetagetin added in the oil is more than 1000 ppm.

11. The method according to claim 1, wherein the amount of the quercetagetin added in the oil is more than 2000 ppm.

12. The method according to claim 2, wherein the amount of the quercetagetin added in the oil is more than 10 ppm.

13. The method according to claim 2, wherein the amount of the quercetagetin added in the oil is more than 100 ppm.

14. The method according to claim 2, wherein the amount of the quercetagetin added in the oil is more than 200 ppm.

15. The method according to claim 2, wherein the amount of the quercetagetin added in the oil is more than 1000 ppm.

16. The method according to claim 2, wherein the amount of the quercetagetin added in the oil is more than 2000 ppm.

17. The method according to claim 3, wherein the amount of the quercetagetin added in the oil is more than 10 ppm.

18. The method according to claim 3, wherein the amount of the quercetagetin added in the oil is more than 200 ppm.

19. The method according to claim 3, wherein the amount of the quercetagetin added in the oil is more than 1000 ppm.

20. The method according to claim 3, wherein the amount of the quercetagetin added in the oil is more than 2000 ppm.

* * * * *